US008731237B1

(12) United States Patent
Fitzsimmons et al.

(10) Patent No.: US 8,731,237 B1
(45) Date of Patent: May 20, 2014

(54) AUTOMATIC ASSET DETECTION FOR DISASTER RELIEF USING SATELLITE IMAGERY

(75) Inventors: Bo Fitzsimmons, San Diego, CA (US); Heidi Buck, San Diego, CA (US); Bryan Bagnall, San Diego, CA (US); Elan Sharghi, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 168 days.

(21) Appl. No.: 13/535,801

(22) Filed: Jun. 28, 2012

Related U.S. Application Data

(63) Continuation-in-part of application No. 12/777,349, filed on May 11, 2010, now Pat. No. 8,369,567.

(51) Int. Cl.
*G06K 9/00* (2006.01)
*G06K 9/68* (2006.01)

(52) U.S. Cl.
USPC .......................... 382/100; 382/218

(58) Field of Classification Search
None
See application file for complete search history.

(56) References Cited

U.S. PATENT DOCUMENTS 6,008,492 A * 12/1999 Slater et al. ............ 250/334

OTHER PUBLICATIONS

Wen et al. "A New Change Detection Method for Two Remote Sensing Images based on Spectral Matching." International Conference on Industrial Mechatronics and Automation, May 15, 2009, pp. 89-92.*

Tien et al., "Swimming Pool Identification from Digital Sensor Imagery using SVM", Digital Image Computing Techniques and Applications, 9th Biennial Conference of the Australian Pattern Recognition Society, Dec. 2007, pp. 523-527.

Galindo et al., "Swimming Pool Localization in Colour High-Resolution Images", Geoscience and Remote Sensing Symposium, 2009, IEEE Iternational, IGARSS Jul. 2009, pp. IV-510 to IV-513.

Jiahang Liu et al., "Extraction of Water Bodies from Remotely Sensed Images", Intelligent Signal Processing and Communication Systems, 2010 (ISPACS 2010), International Symposium, Dec. 2010.

Dong Liu et al., "Extraction of Water-Body in Remote Sensing Image Based on Logic Operation: Geoinformatics", 2011, 19th International Conference Jun. 2011.

* cited by examiner

*Primary Examiner* — Jon Chang
(74) *Attorney, Agent, or Firm* — Arthur K. Samora; Kyle Eppele; SPAWAR Systems Center Pacific

(57) ABSTRACT

Systems and methods for automatic detection of disaster relief assets from a satellite image can include a satellite and a processor, which can contain non-transitory written directions that perform a method, which includes the step of defining spectra of interest (SOI). A reference spectral profile that is based on the SOI is built. The reference spectral profile can extend into the near infrared range to eliminate false positive indications. A satellite image of the spatial region of interest (ROI) is taken. For each pixel in the ROI, test spectra of the spatial region can be extracted and compared to the reference spectral profile using a spectral angle mapper (SAM) tool. When the comparison meets predetermined parameters, that pixel of the ROI can be deemed to be indicative of a disaster relief asset, and the geo-reference data for that pixel can be transmitted to a remote user.

12 Claims, 8 Drawing Sheets

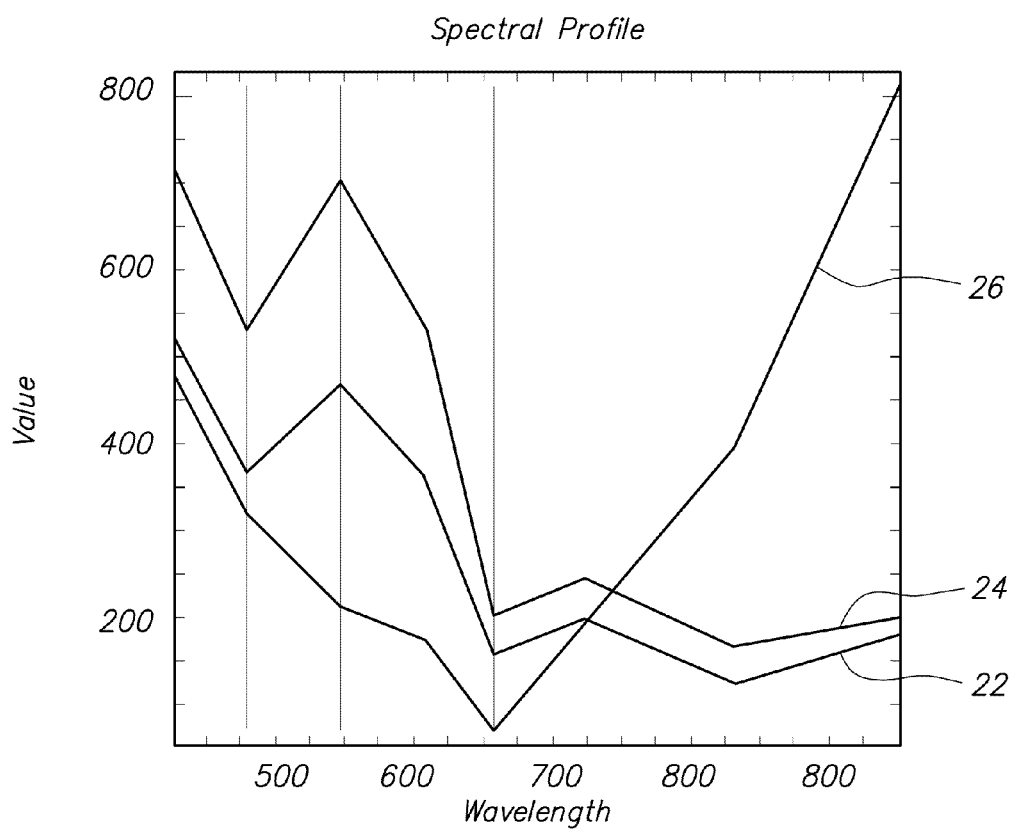
FIG. 4
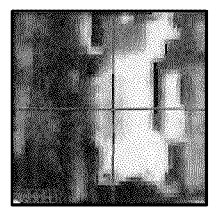     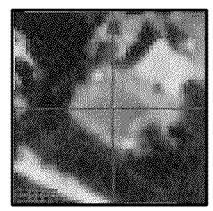     
FIG. 5A          FIG. 5B          FIG. 5C

AUTOMATIC ASSET DETECTION FOR DISASTER RELIEF USING SATELLITE IMAGERY

This application is a continuation-in-part of prior application Ser. No. 12/777,349, filed May 11, 2010 now U.S. Pat. No. 8,369,567.

FEDERALLY-SPONSORED RESEARCH AND DEVELOPMENT

This invention (Navy Case No. 101577) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; email ssc pac T2@navy.mil.

FIELD OF THE INVENTION

The present invention applies generally to satellite imagery. More specifically, some embodiments of the invention pertain to the processing of satellite vessel imagery to quickly and automatically detect assets for disaster relief, such as sources of water for firefighting efforts, according to a predetermined algorithm.

BACKGROUND OF THE INVENTION

Aerial firefighter pilots often use helicopters with attached Bambi buckets or hanging snorkels to collect water for air attacks on fires. The sources of water for these aerial firefighters can range from large lakes and reservoirs to pumpkins, which are small portable swimming pools installed by firefighters on the ground, and which tend to be slightly larger than the Bambi bucket. The pumpkin is a solution for areas where transit time to a known lake or reservoir is too long, but it requires time and personnel to set up, and a highly skilled pilot to safely access the pumpkin with the Bambi bucket. In still other scenarios, it may be desirable to obtain water from local swimming pools, particularly in areas where water sources are in scarce supply, and/or too remote from the fire location to allow for effective aerial firefighting.

When helicopters are used for aerial fighting, the pilot may in some cases be able to locate a body of water without assistance. But the helicopter may not have enough altitude to be able to see all bodies of water that are within range for firefighting efforts. Additionally, the pilot is engaged in operating the aircraft safely during the firefighting efforts, often by literally flying the helicopter through fire. The pilot often will not have enough time to look for water sources. What is desired is a system and method that detects water bodies within a selected range of a fire location and that either relays the water resource location to the helicopter pilot in a format that can be understood quickly, or simply vectors the pilot to the water resource by providing a heading and a range to the water body.

One way to accomplish the above could be to detect bodies of water using satellite imagery. But detecting bodies of water or other regions of interest, particularly in multispectral satellite images, is currently a manual process, where an analyst examines the image to find the water bodies. The analysts must then superimpose the imagery over a geo-referenced image, so that the analyst can gather each region's latitude and longitude and manually record the data. Finally, the analyst must relay the position data of the water resource to the aerial firefighter pilot.

In view of the above, it is an object of the present invention to provide a system and method for asset detection relief that can locate disaster relief assets such as bodies of water for remote firefighting efforts. Yet another object of the present invention is to provide a system and method for asset detection relief that displays geo-referenced, automatically detected swimming pools from satellite images that will quickly and accurately provide information of alternate, potentially strategic water sources for aerial firefighters. Another object of the present invention is to provide a system and method for asset detection relief that can generate location data for water body resources in a format that is quickly and easily understood by an aerial firefighter pilot. Yet another object of the present invention is to provide a system and method for asset detection relief that can generate location data for water body resources and simultaneously disseminate that location data to a plurality of firefighting assets to minimize the flight time of each aerial asset to the water body and to ensure that assets are not vectored to the same water body. Still another object of the device is to provide a system and method for asset detection relief that is easy to manufacture and use in a cost-effective manner.

SUMMARY OF THE INVENTION

A system and method for automatic detection of disaster relief assets from a satellite image according to several embodiments can include a satellite and a processor that can be in communication with the satellite. The processor can contain non-transitory written directions that can perform a method, said method, which can include the step of defining a spectra of interest (SOI). The SOI is typically a color of the visible spectrum that is indicative of an asset. For example, for detection of water bodies for fire-fighting assets, the SOI can be defined to be portions of the visible blue range.

The methods according to several embodiments can further include the step of building a reference spectral profile that can be based on the SOI. The reference spectral profile can extend into the near infrared wavelength range, in order to eliminate false positive indications. A satellite image of the spatial region of interest (ROI) can be taken. For each pixel in the ROI, test spectra of the spatial ROI can be extracted and compared to reference spectral profile using a spectral angle mapper (SAM) tool. When the comparison using the SAM tool falls below a certain value, that pixel of the ROI can be deemed to be indicative of a disaster relief asset. In cases where the pixel is indicative of a disaster relief asset, the geo-reference data for that pixel can be transmitted to a remote user (or simultaneously to a plurality of remote users) for the user's consideration.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which:

FIG. 4 is a graph of a plurality of example reference spectral profiles, which can be generated by the systems and method of FIG. 2;

FIGS. 5A-5C are color photographs of spatial region that are represented by the spectral profiles in FIG. 4;

DETAILED DESCRIPTION OF THE EMBODIMENTS

Figure 1:
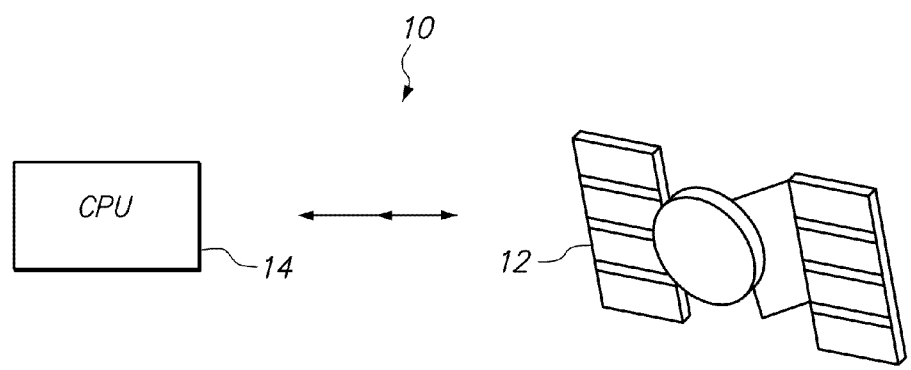
FIG. 1 is a block diagram of a system for detecting disaster relief assets using satellite imagery, according to several embodiments of the present invention.

In brief overview, and referring initially to FIG. 1, a system for detecting disaster relief assets using satellite imagery is shown and is generally designated by reference character 10. As shown, the system 10 can include a satellite 12 and a processor 14 that is in communication with the satellite 12. The satellite can generate images of spatial regions of interest (ROI) using imagery methods that are known in the art. One such imagery method can include nadir panchromatic electro-optical imagery, although other methods for generating satellite imagery could also be used. It should also be appreciated that other sources of overhead imagery could be used to practice the methods of the present invention. For example, an aircraft (not shown) could be used to provide the applicable imagery. For these embodiments, the processor 14 could be located on the aircraft. The processor 14 can include non-transitory instructions such as computer programs, which when activated, can carry out the methods of the present invention according to several embodiments, as described more fully below.

Figure 2:
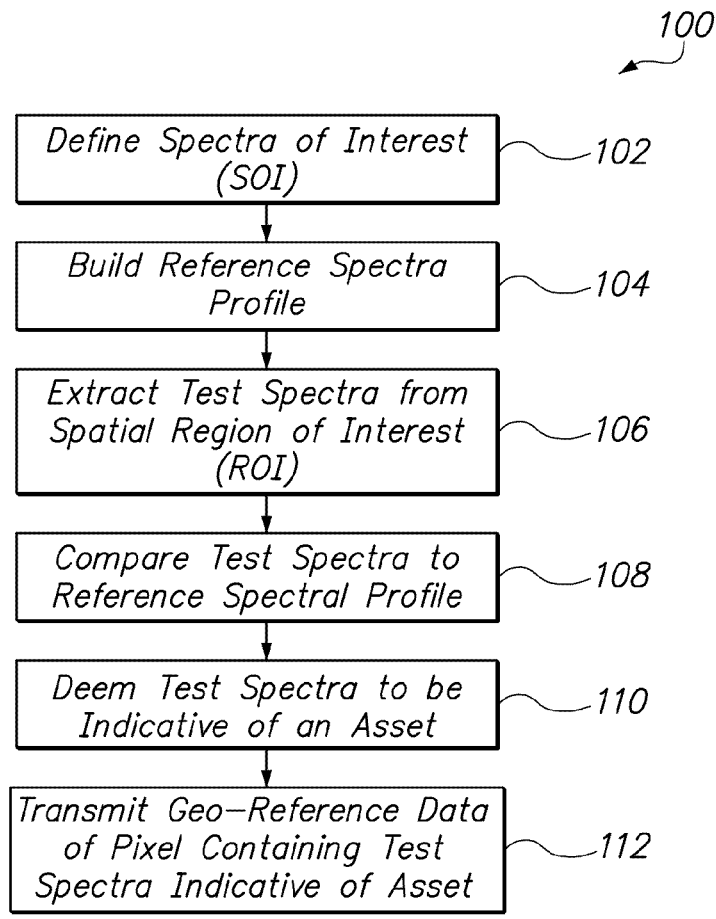
FIG. 2 is block diagram, which illustrates steps that can be taken by the system of FIG. 1 to accomplish the methods according to several embodiments of the present invention.

Referring now to FIG. 2, a block diagram for accomplishing the methods for detecting disaster relief assets using satellite imagery is shown and is designated by reference character 100. As shown, method 100 can include the initial step 102 of defining a spectra-of-interest (SOI) that is indicative of the disaster relief asset to be detected. In some embodiments, the SOI is a blue color that is indicative of bodies of water, such as swimming pools, which could be accessed for firefighting efforts. In other embodiments, the SOI to be defined could be a blue that is indicative of a large tarp. In still other embodiments, although not necessary indicative of a "disaster relief asset", the SOI can be defined as a color that is indicative of a fire at the geo-reference location that corresponds to the pixel that contains the SOI. In cases for law enforcement purposes, provided the satellite 12 yields imagery with sufficient resolution, the SOI can defined as a green color that is the indicative of the presence of marijuana plant, or an SOI can be defined that is indicative of poppies (which can yield heroin), and the geo-referenced location of the SOI can be used for law enforcement purposes.

Once the SOI is defined, the methods according to several embodiments can include the step of building a library of reference spectral profiles of the SOI, as shown by block 104 in FIG. 2. For several embodiments, the SOI can be a blue color that is indicative of a body of water or a blue tarp. For these embodiments, high resolution panchromatic images and low resolution multispectral images can be fused. The image fusion can be performed using a Gram-Schmidt sharpening method of the two images. The resulting high spatial resolution of the pan sharpened image can produce an image that facilitates generation of the reference spectral profile.

To generate a reference profiles library for the SOI for firefighting purposes, a test image that includes pixels that are known to contain the SOI is taken, and several techniques are used to generate the library of reference spectral profiles. First, three distinct pool colors can be noted within the test image for the pixels that contain the SOI. These colors can be labeled cyan, cadet blue and blue. Example images of these colors are show in FIGS. 5A-5C, respectively. The corresponding spectral profiles for FIGS. 5A-5C are profiles 22, 24 and 26, respectively as shown in FIG. 4. FIG. 4 illustrates that pixel spectral profiles for each color type (difference shade of the SOI), can be plotted together to compare the three color types. From viewing FIG. 4, it can be apparent that the differences between cyan (profile 22) and cadet blue (profile 24) profiles are primarily a result of the reflection intensities in the visible band. However, the blue color of profile 26 demonstrates an uncharacteristic profile for any body of water, considering the very high reflectance in the NIR wavelengths. Thus, for occasions where the asset to be detected is a pool or other body of water, the reference spectral profiles, can include the near infrared (NIR) range, in order to eliminate false positives.

Figure 8:
FIG. 8 is a color photograph of the same spatial region of interest as FIG. 6, but in the near infrared (NIR) range.
Figure 9:
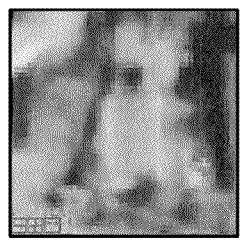
FIG. 9 is a color photograph of an enlarged portion of the marked inset of FIG. 8.

FIGS. 6-9 are illustrative of the NIR effect shown by profile 26 in FIG. 4. When a red-green-blue (RGB) image is used, and referring to FIG. 6, all blue colors appear to bodies of water (swimming pools) including the "pool" shown in FIG. 7. But a spectral profile 26 can be built to include the inputs from the image in the NIR and green range, and as shown in FIG. 8. When a NIR2-NIR1-green image is used (FIG. 8), all pool targets appear dark blue with exception of the "pool" illustrated in FIG. 9. This object is not a pool because it appears orange in FIG. 9. In reality, this object is actually a blue tarp. Thus, the NIR portion of the reference spectral profile can be used to eliminate false positives, as demonstrated in FIGS. 6-6A, 7 and 7A. It should also be appreciated, however, that the spectral profile represented by profile 26, could be used by the remote user, and it could actually function as the primary output of the methods for some embodiments. Stated differently, the methods according to several embodiments could be used to locate blue tarps (which are also indicative of the location of disaster assets), as opposed to being declared as a false positive when the method is being used to locate SOI that are indicative of water bodies.

Figure 3:
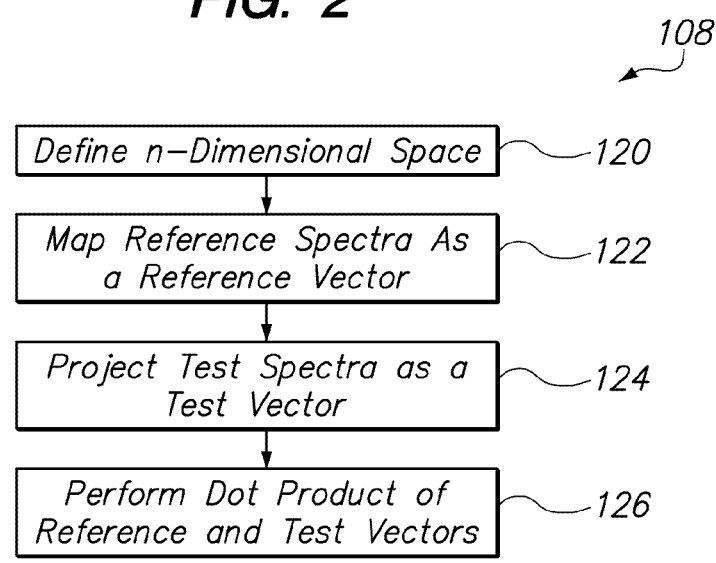
FIG. 3 is a block diagram, which shows more fully substeps that can be taken to accomplish the compare step in FIG. 2.
Figure 6:
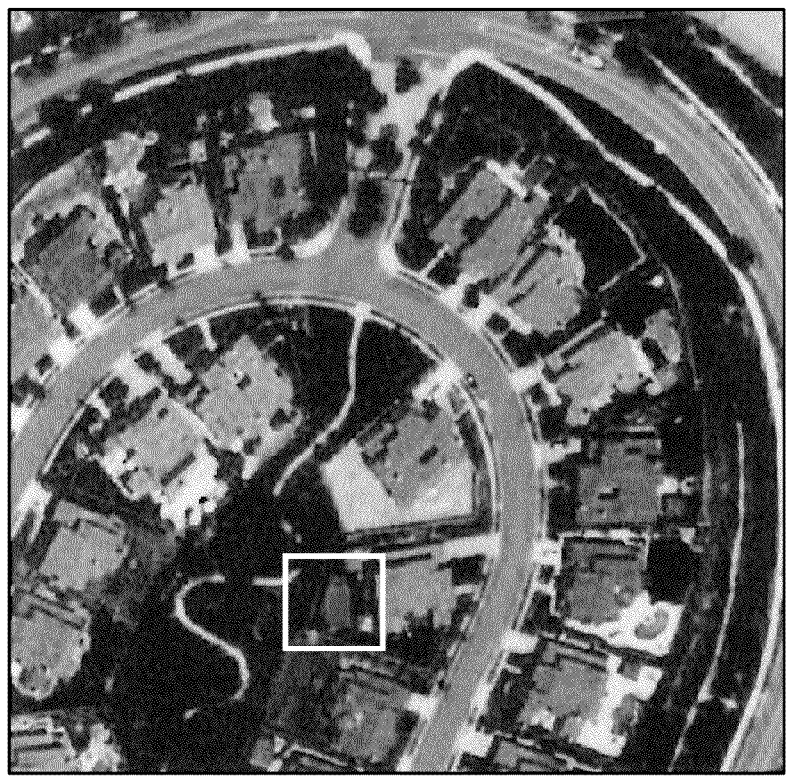
FIG. 6 is a color photograph of a red-green-blue (RGB) image of a spatial region of interest from a representative satellite of FIG. 1
Figure 7:
FIG. 7 is a color photograph of an enlarged portion of the marked inset of FIG. 6.

Once the library of reference spectral profiles is built, and referring again to FIG. 2 and to FIG. 3, the processor instructions and methods according to several embodiment can include the step of extracting test spectra for a spatial region of interest (ROI), as indicated by step 106 in FIG. 2 and comparing to the reference profiles, as indicated by step 108 in FIG. 2. To do this, for each pixel in an image spatial ROI, the spectral angle mapper (SAM) by ENVI, which is a software solution by Exelis® for quickly, easily, and accurately extracting information from geospatial imagery, can be used. The SAM tool maps similar test spectra to reference spectra by projecting the spectra as a vector in an n-dimensional space, where n represents the number of bands in the spectra (i.e., the number of bands that satellite 12 is imaging). As shown in FIG. 3, step 108 can include the sub-step 120 of defining an n-dimensional vector (where n is the same number of spectral bands in the satellite image), and mapping the reference spectral profile as a vector (step 122), projecting the SOI in the pixel as a vector, as depicted by block 124, and performing a threshold on the angle between the reference spectral vector from step 122 and the test spectra vector from step 124. One way to perform the thresholding is to perform a dot product on the two vectors, as indicated by step 126 in FIG. 3.

Figure 10:
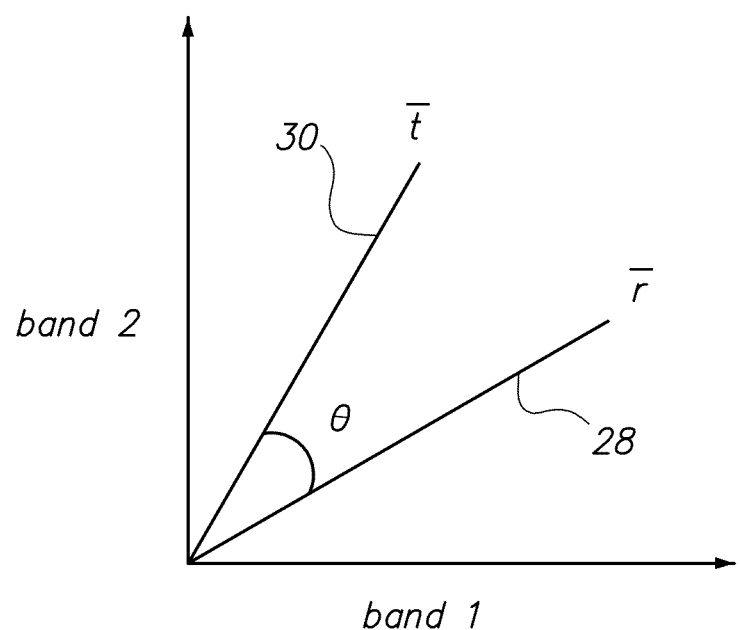
FIG. 10 is a graph that represents how the reference spectral profile and test spectra are compared using the spectral angle mapping tool.

To visualize the concept of SAM, and referring to FIG. 10, a case where n=2 is shown. It should be appreciated that in several embodiments (indeed, in most embodiments), the satellite will have a spectral capability which require a much higher dimensional calculation. For example, when a Worldview-2 satellite (manufactured by DigitalGlobe®) is used with the systems and methods of the present invention, n will equal 8 because that satellite has 8 spectral divisions. The variable n=2 is being used for clarity of written description.

In FIG. 10, vector r represents the reference spectra, t represents the test spectra, and θ represents the angle between the r and t vectors. The angle θ is found by rearranging the formula for the dot product of r and t, and solving for θ. In our case, the reference spectra value is the spectral library means created for the three pool groups, and the test spectra are all the pixels in the 200×200 pixel spatial ROI.

$$\theta = \cos^{-1}\left(\frac{\vec{t}\cdot\vec{r}}{\|\vec{t}\|\cdot\|\vec{r}\|}\right) \quad (1)$$

and, $$\theta = \cos^{-1}\left(\frac{\sum_{i=1}^{n} t_i r_i}{\left(\sum_{i=1}^{n} t_i^2\right)^{\frac{1}{2}}\left(\sum_{i=1}^{n} r_i^2\right)^{\frac{1}{2}}}\right) \quad (2)$$

For a Worldview-2 satellite with a 200×200 pixel ROI, an angle of 0.1 radians is chosen for the threshold, or the predetermined value. When the results of the compare step (and sub-steps 120-126 above) result in an angle θ (in radians) of <0.1, then the test spectra that was used to building the vector t is sufficiently close to the reference vector r (which represents the reference spectra) and the test spectra is deemed to contain the SOI, as indicated by step 110 in FIG. 2. Additional post-processing of the SAM classification results is performed using the ENVI clump classes tool to fill in holes from the SAM classification results. Test results using the above parameters have resulted in classification accuracies of 83%, with only one false detect out of three images containing a total of 92 pools.

Figure 11:
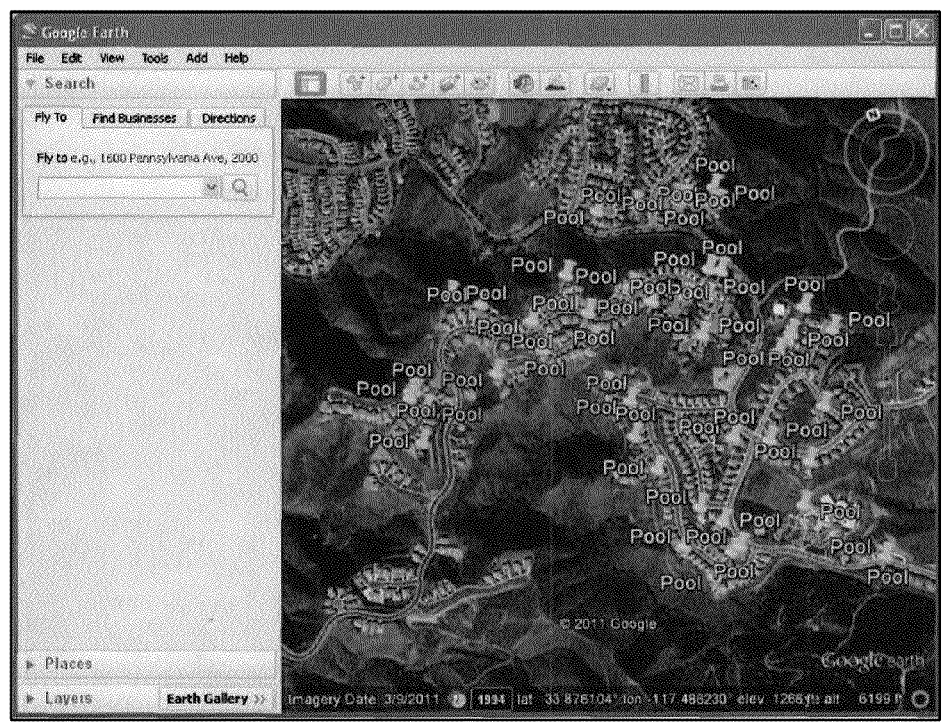
FIG. 11 is a color photograph of a screen shot, which shows how the geo-reference of locations of disaster relief assets can be displayed; and, FIG. 12 is the same as FIG. 9, but re-formatted to in a manner that allow a remote user to be vectored to the asset.
Figure 12:

Once a pixel has been deemed to contain the SOI, the pixel x and y location values can then converted to map lat and long values, using the ENVI convert file coordinates function in some embodiments. The resulting classification image containing the spatial ROI that contains the SOI can be overlaid on an RGB representation of the input image using the ENVI class overlay function, and the map values can be displayed in a list. This geo-reference data can then be transmitted to a remote user, as indicated by block 112 in FIG. 2. One way to do this can be to create a kml writer that produces a kml file for the detected locations. The kml file produces a marker for each detected object position on Google Earth (GE). Screenshots of the GUIs and an output result for the plug-in are displayed in FIG. 11, and a screenshot of the kml writer is displayed in FIG. 12. Alternative constructions of software solutions like iPad apps are possible. It should also be appreciated the geo-reference data could be transmitted simultaneously to multiple remote firefighting aerial assets, as well as to a remote user located at a command center, who could coordinate the aerial asset movement.

From the above, it can be seen the invention can provide an automatic tool for detecting and geo-locating ROI faster and more efficiently than old methods. The time consuming, and manual approach of collecting reference spectra, performing SAM, overlaying and evaluating the results is replaced with a few button clicks. Additionally, the time consuming and error prone method of manually collecting classified object latitude and longitude information and storing the data is improved by automatically collecting detected object geo-location data and providing both a text form of the data and a visual representation in the form of a GE kml. This invention has practical applications for the firefighting community as a tool for aiding aerial firefighting pilots in their search for fire suppression water sources, as demonstrated in FIG. 12. Currently no known tool of this kind is available to aerial firefighters.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for detecting assets for disaster relief using multi-spectral satellite images of a satellite, comprising the steps of:
   A) defining a spectra of interest (SOI) that is indicative of said asset;
   B) building a reference spectral profile from said SOI;
   C) extracting test spectra from a spatial region of said satellite image;
   D) comparing said test spectra to said reference spectral profile using a spectral angle mapper (SAM) tool, said step D) having sub-steps comprising;
      D1) defining an n-dimensional space according to the number of spectral divisions from said satellite;
      D2) mapping said reference spectra as an n-dimensional reference vector;
      D3) projecting said test vector as an n-dimensional test vector;
      D4) performing the dot product of the result of said sub-steps D3) and D4); and,
   E) deeming said test spectra to be indicative of a disaster relief asset when the results of said step D) are below a predetermined value.

2. The method of claim 1, where each of said satellite images further include an M×N matrix of pixels, and wherein said steps C) through E) are accomplished for each said pixel.

3. The method of claim 1, wherein said step B) is accomplished using a test image from said satellite that is known to contain said SOI.

4. The method of claim 1 wherein said SOI from said step B) includes spectra in the near infrared range.

5. The method of claim 1 wherein said test spectra has a predetermined value in said step E) of 0.1 radians.

6. The method of claim 1, wherein said test spectra has corresponding geo-reference data, and further comprising the step of:
   F) transmitting said geo-reference data to at least one remote user when the result of said step E) are indicative of the presence of a disaster relief asset in said spatial region.

7. A system, comprising:
   a satellite;
   a processor in communication with said satellite, said processor containing non-transitory written directions that cause the system to perform a method for detecting assets for disaster relief using multi-spectral satellite images, said method including the steps of;
   A) defining a spectra of interest (SOI) that is indicative of said asset;
   B) building a reference spectral profile from said SOI;
   C) extracting test spectra from a spatial region of said satellite image;
   D) comparing said test spectra to said reference spectral profile using a spectral angle mapper (SAM) tool, said step D) having sub-steps comprising;
      D1) defining an n-dimensional space according to the number of spectral divisions from said satellite;
      D2) mapping said reference spectra as an n-dimensional reference vector;
      D3) projecting said test vector as an n-dimensional test vector;
      D4) performing the dot product of the result of said sub-steps D3) and D4); and,
   E) deeming said test spectra to be indicative of a disaster relief asset when the results of said step D) are below a predetermined value.

8. The system of claim 7, where each of said satellite images further includes an M×N matrix of pixels, and wherein said steps C) through E) are accomplished for each said pixel.

9. The system of claim 7, wherein said step B) is accomplished using a test image from said satellite that is known to contain said SOI.

10. The system of claim 7 wherein said SOI from said step B) includes spectra in the near infrared range.

11. The system of claim 7 wherein said predetermined value in said step E) is 0.1 radians.

12. The system of claim 7, wherein said test spectra has corresponding geo-reference data, and said written instructions further accomplish the step of:
    F) transmitting said geo-reference data to a remote user when the result of said step E) are indicative of the presence of a disaster relief asset in said spatial region.

* * * * *